United States Patent
Pons

(10) Patent No.: US 9,897,083 B2
(45) Date of Patent: Feb. 20, 2018

(54) CALCULATING DOWNHOLE CARDS IN DEVIATED WELLS

(71) Applicant: Victoria M. Pons, Katy, TX (US)

(72) Inventor: Victoria M. Pons, Katy, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 921 days.

(21) Appl. No.: 13/663,155

(22) Filed: Oct. 29, 2012

(65) Prior Publication Data

US 2013/0104645 A1 May 2, 2013

Related U.S. Application Data

(60) Provisional application No. 61/552,812, filed on Oct. 28, 2011, provisional application No. 61/598,438, (Continued)

(51) Int. Cl.
*G06F 7/60* (2006.01)
*G06G 7/48* (2006.01)
(Continued)

(52) U.S. Cl.
CPC .......... *F04B 49/065* (2013.01); *E21B 43/127* (2013.01); *E21B 47/0008* (2013.01);
(Continued)

(58) Field of Classification Search
CPC ........... F04B 49/065; F04B 2201/1211; F04B 47/022; F04B 51/00; F04B 49/20;
(Continued)

(56) References Cited

U.S. PATENT DOCUMENTS

| 3,343,409 A | 9/1967 | Gibbs |
|---|---|---|
| 4,490,094 A | 12/1984 | Gibbs |

(Continued)

FOREIGN PATENT DOCUMENTS

| RU | 2160385 C1 | 12/2000 |
|---|---|---|
| SU | 1048167 A1 | 10/1983 |

OTHER PUBLICATIONS

Xu et al., "A comprehensive rod-pumping model and its applications to vertical and deviated wells", 1999, SPE mid-continent operations symposium, pp. 1-9.*

(Continued)

*Primary Examiner* — Juan Ochoa
(74) *Attorney, Agent, or Firm* — Blank Rome LLP

(57) ABSTRACT

Diagnosing a pump apparatus having a downhole pump disposed in a deviated wellbore characterizes axial and transverse displacement of a rod string with two coupled non-linear differential equations of fourth order, which include axial and transverse equations of motion. To solve the equations, derivatives are replaced with finite difference analogs. Initial axial displacement of the rod string is calculated by assuming there is no transverse displacement and solving the axial equation. Initial axial force is calculated using the initial axial displacement and assuming there is no transverse displacement. Initial transverse displacement is calculated using the initial axial force and the initial axial displacement. Axial force and friction force are calculated using the initial displacements, and the axial displacement at the downhole pump is calculated by solving the axial equation with the axial force and the friction force. Load at the downhole pump is calculated so a downhole card can be generated.

16 Claims, 6 Drawing Sheets

Related U.S. Application Data filed on Feb. 14, 2012, provisional application No. 61/605,325, filed on Mar. 1, 2012, provisional application No. 61/706,489, filed on Sep. 27, 2012.

(51) Int. Cl.

| | |
|---|---|
| *F04B 49/06* | (2006.01) |
| *F04B 49/20* | (2006.01) |
| *F04B 47/02* | (2006.01) |
| *F04B 51/00* | (2006.01) |
| *E21B 43/12* | (2006.01) |
| *E21B 47/00* | (2012.01) |
| *G05B 13/04* | (2006.01) |

(52) U.S. Cl.
CPC ............ *F04B 47/022* (2013.01); *F04B 49/20* (2013.01); *F04B 51/00* (2013.01); *E21B 2043/125* (2013.01); *F04B 2201/121* (2013.01); *F04B 2201/1211* (2013.01); *G05B 13/042* (2013.01)

(58) Field of Classification Search
CPC ............ F04B 2201/121; G05B 13/042; E21B 43/127; E21B 47/0008; E21B 2043/125
USPC ....................................................... 703/2, 10
See application file for complete search history.

(56) References Cited

U.S. PATENT DOCUMENTS

| | | | |
|---|---|---|---|
| 4,594,665 | A | 6/1986 | Chandra et al. |
| 5,252,031 | A | 10/1993 | Gibbs |
| 5,423,224 | A | 6/1995 | Paine |
| 5,464,058 | A | 11/1995 | McCoy et al. |
| 7,032,659 | B2 | 4/2006 | Barnes et al. |
| 7,168,924 | B2 | 1/2007 | Beck et al. |
| 7,500,390 | B2 | 3/2009 | Mills |
| 8,036,829 | B2 | 10/2011 | Gibbs et al. |
| 8,433,516 | B1* | 4/2013 | Gibbs ................... F04B 49/065 702/187 |
| 2003/0065447 | A1 | 4/2003 | Bramlett et al. |
| 2004/0062657 | A1 | 4/2004 | Beck et al. |
| 2005/0155759 | A1* | 7/2005 | Bramlett ............. E21B 47/0008 166/250.15 |
| 2006/0149476 | A1 | 7/2006 | Gibbs et al. |
| 2006/0251525 | A1 | 11/2006 | Beck et al. |
| 2007/0286750 | A1 | 12/2007 | Beck et al. |
| 2010/0111716 | A1 | 5/2010 | Gibbs et al. |
| 2011/0091332 | A1 | 4/2011 | Ehimeakhe |
| 2011/0091335 | A1 | 4/2011 | Ehimeakhe et al. |

OTHER PUBLICATIONS

Liu et al., "A Uniform and Reduced Mathematical Model for Sucker Rod Pumping", 2004, Computational Science-ICCS, Springer Berlin Heidelberg, pp. 372-379.*
J. Xu, "A method for diagnosing the performance of sucker rod string in straight inclined wells", 1994, Society of Petroleum Engineers Latin America/Caribbean Petroleum Engineering Conference, pp. 725-733.*
Chao Sun and Stanislaw Lukasiewicz, "A new model on the buckling of a rod in tubing", 2006, Journal of Petroleum Science and Engineering 50.1, pp. 78-82.*
S. Lukasiewicz, "Computer Model Evaluates Oil Pumping Units in Inclined Wells", 1990, Journal of Canadian Petroleum Technology 29.06, pp. 76-79.*
Lukasiewicz et al., "On adaptive modelling and filtering in computer simulation and experimental mechanics", 2007, Bulletin of The Polish Academy of Sciences, Technical Sciences 55.1, pp. 99-106.*
Gibbs, "Design and diagnosis of deviated rod-pumped wells", 1992, Journal of Petroleum Technology 44.07, pp. 774-781.*
Lukasiewicz and Hojjati, "A new algorithm for adaptive modeling of mechanical systems", 2004, Fourth International ICSC Symposium on Engineering Intelligent Systems EIS, pp. 1-7.*
Lukasiewicz, "Analysis of Rod Pumping Installations in the Inclined Wells", 1989, pp. 1-23.*
Everitt, T. A. and Jennings, J. W., "An Improved Finite-Difference Calculation of Downhole Dynamometer Cards for Sucker-Rod Pumps," SPE 18189, 1991.
Gibbs, S. G., "Design and Diagnosis of Deviated Rod-Pumped Wells", SPE 22787, 1992.
Lukasiewicz, S. A., "Dynamic Behavior of the Sucker Rod String in the Inclined Well", SPE 21665, 1991.
Lui, X. et al., "An Approach to the Design Calculation of Sucker Rod Pumping System in Coalbed Methane Wells," Chinese Journal of Mechanical Engineering, vol. 24, No. 2011.
Weatherford International, "ePIC Rod Pump Controller," Product Brochure, copyright 2008.
Weatherford International, "LOWIS: Life of Well Information Software," Product Brochure, copyright 2008.
Weatherford International, "Model 2000 Rod Pump Controller," Product Brochure, copyright 2008.
Weatherford International, "WellPilot Rod Pump Optimization Controller," Product Brochure, copyright 2010-2012.
International Search Report and Written Opinion received in counterpart PCT Appl. No. PCT/2012/062459 dated Jan. 15, 2013.
International Search Report and Written Opinion received in counterpart PCT Appl. No. PCT/US2012/062463 dated Feb. 4, 2013.
Rosberg, "Well testing, methods and applicability", Engineering Geology Lund University, 2010. [Retreived on Dec. 21, 2012]. Retrieved from the internet:<URL:http://lup.lub.lu.se/luur/download?func=downloadFile&recordOld=1598933&fileOld=1598935>.
Weidner, "Horsepower to Drive a Pump", Phillips Electric 2003, pp. 1-6 [Retreived on Dec. 21, 2012]. Retrieved from the internet:,URL:http://www.phillipselectric.com/pdf/HP_Req_for_Pumps.pdf>.
First Office Action received in counterpart Canadian Appl. No. 2,857,144 dated Mar. 12, 2015.
Ehimeakhe, V., "Comparative Study of Downhole Cards Using Modified Everitt-Jennings Method and Gibbs Method", Southwestern Petroleum Short Course 2010.
Ehimeakhe, V., "Calculating Pump Fillage for Well Control using Transfer Point Location", SPE Eastern Regional Meeting, Oct. 12-14, 2010.
Gibbs, S. G., and Neely, A. B., "Computer Diagnosis of Down-Hole Conditions in Sucker Rod Pumping Wells," JPT (Jan. 1996) 91-98; Trans., AIME,237.
Gibbs, S. G., "A Review of Methods for Design and Analysis of Rod Pumping Installations," SPE 9980 presented at the 1982 SPE International Petroleum Exhibition and Technical Symposium, Beijing, Mar. 18-26.
Knapp, R. M., "A Dynamic Investigation of Sucker-Rod Pumping," MS thesis, U. of Kansas, Topeka (Jan. 1969).
Schafer, D. J. and Jennings, J. W., "An Investigation of Analytical and Numerical Sucker-Rod Pumping Mathematical Models," paper SPE 16919 presented at the 1987 SPE Annual Technical Conference and Exhibition, Sep. 27-30.
Ehimeakhe, V., "Modified Everitt-Jennings (MEJ) Method and the Gibbs Method: Downhole Card Comparison", 6th Annual Sucker Rod Pumping Workshop, Sep. 14-17, 2010.
Extended Search Report received in corresponding EP Appl. 12 84 4402.3, dated May 31, 2016, 7-pgs.
Office Action in counterpart Chinese Appl. 201280064553.2, dated Jun. 20, 2016, 29-pgs.
Decision to Grant in counterpart Russian Appl. 2014121403, dated Jun. 3, 2015, 17-pgs.

* cited by examiner (BACKGROUND)

(BACKGROUND)

(BACKGROUND)

(BACKGROUND)

CALCULATING DOWNHOLE CARDS IN DEVIATED WELLS

CROSS-REFERENCE TO RELATED APPLICATIONS

This application claims the benefit of U.S. Patent Application Ser. No. 61/552,812 entitled "Modified Everitt-Jennings With Dual Iteration on the Damping Factors and Adaptation to Deviated Wells by Including Coulombs Friction" and filed 28 Oct. 2011; Ser. No. 61/598,438 entitled "Modified Everitt-Jennings With Dual Iteration on the Damping Factors" and filed 14 Feb. 2012; Ser. No. 61/605,325 entitled "Implementing Coulombs Friction for the Calculation of Downhole Cards in Deviated Wells" and filed 1 Mar. 2012; and Ser. No. 61/706,489 entitled "Iterating on Damping when Solving the Wave Equation and Computation of Fluid Load Lines and Concavity Testing" and filed 27 Sep. 2012, each of which is incorporated herein by reference in its entirety. This application is also filed concurrently with co-pending application Ser. No. 13/663,161 entitled "Fluid Load Line Calculation and Concavity Test for Downhole Pump Card," Ser. No. 13/663,167 entitled "Calculating Downhole Pump Card With Iterations on Single Damping Factor," and Ser. No. 13/663,174 entitled "Calculating Downhole Pump Card With Iterations on Dual Damping Factors," each of which is incorporated herein by reference.

BACKGROUND OF THE DISCLOSURE

A. Sucker Rod Pump System

Reciprocating pump systems, such as sucker rod pump systems, extract fluids from a well and employ a downhole pump connected to a driving source at the surface. A rod string connects the surface driving force to the downhole pump in the wall. When operated, the driving source cyclically raises and lowers the downhole pump, and with each stroke, the downhole pump lifts well fluids toward the surface.

For example, FIG. 1 shows a sucker rod pump system 10 used to produce fluid from a well. A downhole pump 14 has a barrel 16 with a standing valve 24 located at the bottom. The standing valve 24 allows fluid to enter from the wellbore, but does not allow the fluid to leave. Inside the pump barrel 16, a plunger 20 has a traveling valve 22 located at the top. The traveling valve 22 allows fluid to move from below the plunger 20 to the production tubing 18 above, but does not allow fluid to return from the tubing 18 to the pump barrel 16 below the plunger 20. A driving source (e.g., a pump jack 11) at the surface connects by a rod string 12 to the plunger 20 and moves the plunger 20 up and down cyclically in upstrokes and downstrokes.

During the upstroke, the traveling valve 22 is closed, and any fluid above the plunger 20 in the production tubing 18 is lifted towards the surface. Meanwhile, the standing valve 24 opens and allows fluid to enter the pump barrel 16 from the wellbore. The highest point of the plunger's motion is typically referred to as the "top of stroke" (TOS), while the lowest point of the pump plunger's motion is typically referred to as the "bottom of stroke" (BOS).

At the TOS, the standing valve 24 closes and holds in the fluid that has entered the pump barrel 16. Additionally, at the TOS, the weight of the fluid in the production tubing 18 is supported by the traveling valve 22 in the plunger 20 and, therefore, also by the rod string 12, which causes the rod string 12 to stretch.

During the downstroke, the traveling valve 22 initially remains closed until the plunger 20 reaches the surface of the fluid in the barrel 16. Sufficient pressure builds up in the fluid below the traveling valve 22 to balance the pressure. The build-up of pressure in the pump barrel 16 reduces the load on the rod string 12 so that the rod string 12 relaxes.

This process takes place during a finite amount of time when the plunger 20 rests on the fluid, and the pump jack 11 at the surface allows the top of the rod string 12 to move downward. The position of the pump plunger 20 at this time is known as the "transfer point" because the load of the fluid column in the production tubing 18 is transferred from the traveling valve 22 to the standing valve 24. This results in a rapid decrease in load on the rod string 12 during the transfer.

After the pressure balances, the traveling valve 22 opens and the plunger 20 continues to move downward to its lowest position (i.e., the BOS). The movement of the plunger 20 from the transfer point to the BOS is known as the "fluid stroke" and is a measure of the amount of fluid lifted by the pump 14 on each stroke. In other words, the portion of the pump stroke below the transfer point may be interpreted as the percentage of the pump stroke containing fluid, and this percentage corresponds to the pump's fillage. Thus, the transfer point can be computed using a pump fillage calculation.

If there is sufficient fluid in the wellbore, the pump barrel 16 may be completely filled during an upstroke. Yet, under some conditions, the pump 14 may not be completely filled with fluid on the upstroke so there may be a void left between the fluid and the plunger 20 as it continues to rise. Operating the pump system 10 with only a partially filled pump barrel 16 is inefficient and, therefore, undesirable. In this instance, the well is said to be "pumped off," and the condition is known as "pounding," which can damage various components of the pump system. For a pumped off well, the transfer point most likely occurs after the TOS of the plunger 20.

Typically, there are no sensors to measure conditions at the downhole pump 14, which may be located thousands of feet underground. Instead, numerical methods are used calculate the position of the pump plunger 20 and the load acting on the plunger 20 from measurements of the position and load for the rod string 12 at the pump jack 11 located at the surface. These measurements are typically made at the top of the polished rod 28, which is a portion of the rod string 12 passing through a stuffing box 13 at the wellhead. A pump controller 26 is used for monitoring and controlling the pump system 10.

To efficiently control the reciprocating pump system 10 and avoid costly maintenance, a rod pump controller 26 can gather system data and adjust operating parameters of the system 10 accordingly. Typically, the rod pump controller 26 gathers system data such as load and rod string displacement by measuring these properties at the surface. While these surface-measured data provide useful diagnostic information, they may not provide an accurate representation of the same properties observed downhole at the pump. Because these downhole properties cannot be easily measured directly, they are typically calculated from the surface-measured properties.

Methods for determining the operational characteristics of the downhole pump 20 have used the shape of the graphical representation of the downhole data to compute various details. For example, U.S. Pat. No. 5,252,031 to Gibbs, entitled "Monitoring and Pump-Off Control with Downhole Pump Cards," teaches a method for monitoring a rod pumped well to detect various pump problems by utilizing measurements made at the surface to generate a downhole pump card. The graphically represented downhole pump card may then be used to detect the various pump problems and control the pumping unit. Other techniques for determining operational characteristics are disclosed in U.S. Patent Publication Nos. 2011/0091332 and 2011/0091335, which are both incorporated herein by reference in their entireties.

B. Everitt-Jennings Method

In techniques to determine operational characteristics of a sucker rod pump system 10 as noted above, software analysis computes downhole data (i.e., a pump card) using position and load data measured at the surface. The most accurate and popular of these methods is to compute the downhole card from the surface data by solving a one-dimensional damped wave equation, which uses surface position and load as recorded at the surface.

Various algorithms exist for solving the wave equation. Snyder solved the wave equation using a method of characteristics. See Snyder, W. E., "A Method for Computing Down-Hole Forces and Displacements in Oil Wells Pumped With Sucker Rods," Paper 851-37-K, 1963. Gibbs employed separation of variables and Fourier series in what can be termed the "Gibb's method." See Gibbs, S. G. et al., "Computer Diagnosis of Down-Hole Conditions in Sucker Rod Pumping Wells," JPT (January 1996) 91-98; Trans., AIME, 237; Gibbs, S. G., "A Review of Methods for Design and Analysis of Rod Pumping Installations," SPE 9980, 1982; and U.S. Pat. No. 3,343,409.

In 1969, Knapp introduced finite differences to solve the wave equation. See Knapp, R. M., "A Dynamic Investigation of Sucker-Rod Pumping," MS thesis, U. of Kansas, Topeka (January 1969). This is also the method used by Everitt and Jennings. See Everitt, T. A. and Jennings, J. W., "An Improved Finite-Difference Calculation of Downhole Dynamometer Cards for Sucker-Rod Pumps," SPE 18189, 1992; and Pons-Ehimeakhe, V., "Modified Everitt-Jennings Algorithm With Dual Iteration on the Damping Factors," 2012 South Western Petroleum Short Course. The Everitt-Jennings method has also been implemented and modified by Weatherford International. See Ehimeakhe, V., "Comparative Study of Downhole Cards Using Modified Everitt-Jennings Method and Gibbs Method," Southwestern Petroleum Short Course 2010.

To solve the one-dimensional wave equation, the Everitt-Jennings method uses finite differences. The rod string is divided into M finite difference nodes of length $L_i$ (ft), density $\rho_i$ (lbm/ft$^3$) and area $A_i$ (in$^2$). If we let u=u(x, t) be the displacement of position x at time t in a sucker rod pump system, the condensed one-dimensional wave equation reads:

$$v^2 \frac{\partial^2 u}{\partial x^2} = \frac{\partial^2 u}{\partial t^2} + D \frac{\partial u}{\partial t} \quad (1)$$

where the acoustic velocity is given by:

$$v = \sqrt{\frac{144Eg}{\rho}}$$

and D represents a damping factor.

The first and second derivatives with respect to time are replaced by the first-order-correct forward differences and second-order-correct central differences. The second derivative with respect to position is replaced by a slightly rearranged second-order-correct central difference.

In the method, the damping factor D is automatically selected by using an iteration on the system's net stroke (NS) and the damping factor D. The damping factor D can be computed by the equation:

$$D = \frac{(550)(144g)}{\sqrt{2}\pi} \frac{(H_{PR} - H_H)\tau^2}{(\sum \rho_i A_i L_i)S^2} \quad (2)$$

Where $H_{PR}$ is the polished rod horsepower (hp), S is the net stroke (in), $\tau$ is the period of one stroke (sec.), and $H_{HYD}$ is the hydraulic horsepower (hp) obtained as follows:

$$H_{HYD} = (7.36 \cdot 10^{-6}) Q \gamma F_t \quad (3)$$

where Q is the pump production rate (B/D), $\gamma$ is the fluid specific gravity, and $F_t$ is the fluid level (ft). The pump production rate is given by:

$$Q = (0.1166)(SPM)Sd^2 \quad (4)$$

where SPM is the speed of the pumping unit in strokes/minute, and d is the diameter of the plunger.

Additional details on the derivation of the damping factor D in equation (2) and the original iteration on the net stroke and damping factor algorithm are provided in Everitt, T. A. and Jennings, J. W., "An Improved Finite-Difference Calculation of Downhole Dynamometer Cards for Sucker-Rod Pumps," SPE 18189, 1992.

A modified Everitt-Jennings method also uses finite differences to solve the wave equation. As before, the rod string is discretized into M finite difference elements, and position and load (including stress) are computed at each increment down the wellbore. Then, as shown in FIG. 2, an iteration is performed on the net stroke and damping factor, which automatically selects a damping factor for each stroke.

The wave equation is initially solved to calculate the downhole card using surface measurements and an initial damping factor D set to 0.5 (Block 42). The initial net stroke $S_0$ is determined from the computed card, and the fluid level in the well is calculated (Block 44). At this point, a new damping factor D is calculated from equation (2) (Block 46) and so forth, and the downhole card is again computed with the new damping factor D (Block 48). Based on the recalculated downhole card, a new net stroke S is determined (Block 50).

At this point, a check is then made to determine whether the newly determined net stroke S is close within some tolerance $\epsilon$ of the initial or previous net stroke (Decision 52). If not, then another iteration is needed, and the process 40 returns to calculating the damping factor D (Block 46). If the newly determined net stroke is close to the previously determined net stroke (yes at Decision 52), then the iteration for determining the net stroke can stop, and the process 40 continues on to iterate on the damping factor D using the converged net stroke S (Block 54). The downhole data is then calculated using the newly calculated damping factor D (Block 56), and the pump horsepower $H_{pump}$ is then calculated (Block 58).

At this point, a check is made to see if the pump horsepower $H_{pump}$ is close within some tolerance to the hydraulic horsepower $H_{hyd}$ (Decision 60). If so, then the process 40 ends as successfully calculating the downhole pump card with converged net stroke and damping factor D (Block 62). If the pump horsepower $H_{pump}$ and the hydraulic horsepower $H_{hyd}$ are not close enough (no at Decision 60), then the process 40 adjusts the current damping factor D by a ratio of the pump horsepower $H_{Pump}$ and the hydraulic horsepower $H_{Hyd}$ (Block 64). The process 40 of calculating the pump card with this adjusted damping factor D is repeated until the values for the pump and hydraulic horsepower HPump and HHyd are close within the specified tolerance (Blocks 56 through 64).

The advantage of the automatic iteration on the net stroke and the damping factor D as set forth above is that the damping factor D is adjusted automatically without human intervention. Thus, users managing a medium group to a large group of wells do not have to spend time manually adjusting the damping factor D as may be required by other methods.

C. Deviated Well Model

As noted above, most of the methods presently used to compute downhole data using surface position and load as recorded by a dynamometer system at the surface rely on a vertical-hole model that does not take into consideration deviation of the well. For example, FIG. 3A schematically shows a vertical model 30 of a vertical well 18 having a rod string 28 disposed therein. With the well model 30 being vertical, the only relevant friction forces are of viscous in nature. The viscous friction $F_v$ is the result of viscous forces arising in the annular space during a pumping cycle, which are proportional to the velocity of the axial displacement u.

However, when dealing with a deviated well such as shown in a deviated model 32 shown somewhat exaggerated in FIG. 3B, mechanical friction $F_m$ arises from the contact between the tubing 18, the rod string 28, and the couplings 29. Even though those forces $F_m$ can be ignored when the well is mostly vertical, they have to be accounted for when the well is deviated. If the algorithm used to compute the downhole data does not take into consideration the mechanical friction $F_m$ for a deviated well, the resulting downhole card can appear distorted. This condition cannot be helped by changing the viscous damping factor D in the wave equation.

Thus, the vertical model is not well-suited for calculating downhole data when the sucker rod pump system 10 is used in a deviated well. Primarily, the dynamic behavior of the rod string 28 is different for deviated wells than for vertical wells. Indeed, in vertical wells, the rod string 28 is assumed to not move laterally. In deviated wells, however, mechanical friction $F_m$ becomes non-negligible because there is extensive contact between the rod string 28, the couplings 29, and the tubing 18. Also, since the well is deviated, some sections of the rod string 28 can be bent between two couplings 29 in the middle of a dog leg turn, which introduces the concept of curvature of the rod string 28 as well.

The above equations discussed for the wave equation only consider friction forces of a viscous nature in the vertical model. Yet, the friction forces particular to deviated wells are of viscous and mechanical nature, as detailed above. Although mechanical friction $F_m$ has generally been ignored, it has since been addressed. For example, to deal with the Coulombs friction that results from the mechanical friction in a deviated well, the most well-known technique have been disclosed by Gibbs and Lukasiewicz. See Gibbs, S. G., "Design and Diagnosis of Deviated Rod-Pumped Wells," SPE Annual Technical Conference and Exhibition, Oct. 6-9, 1991; and Lukasiewicz, S. A., "Dynamic Behavior of the Sucker Rod String in the Inclined Well," Production Operations Symposium, Apr. 7-9, 1991, both of which are incorporated herein by reference.

To deal with mechanical friction in deviated wells, Gibbs modified the wave equation by adding a Coulombs friction term to it. For example, US Pat. Publication 2010/0111716 to Gibbs et al. includes a term C(x) in the wave equation that represents the rod and tubing drag force. By contrast, Lukasiewicz derived equations for axial and transverse displacement of the rod element, creating a system of coupled differential equations.

D. Equations for Axial and Transverse Displacement of Rod Element

As recognized in Lukasiewicz, a rod string in a deviated well moves longitudinally up and down (i.e., axially) and also moves laterally (i.e., transversely). Thus, the behavior of the axial stress waves as well as the transverse stress waves of a rod element can be analyzed to better characterize the behavior of the rod string 28 in the deviated well.

To that end, FIG. 4 diagrams dynamic behavior of a rod element 34 of a sucker rod pump system for a deviated well model 32. This diagram shows the various forces acting on the rod element 34 in the axial and transverse directions. As represented here, u(s, t) is the axial displacement of the rod element 34 of length ds, and v(s, t) is the transverse displacement of the rod element 34. The radius of curvature $R_\phi$ can be calculated along with the Cartesian coordinates of the wellbore path using a deviation survey. Several methods are available for such calculations, such as a minimum curvature method or a radius-of-curvature method, as disclosed in Gibbs, S. G., "Design and Diagnosis of Deviated Rod-Pumped Wells", SPE Annual Technical Conference and Exhibition, Oct. 6-9, 1991, which is incorporated herein by reference.

In the diagram of the forces acting on the rod element 34, the radius of curvature $R_\phi$ is displayed as an arrow going from the center of the curvature to the rod element 34 of length ds. The axial force denoted F acts upwards and downwards on the rod element 34. The axial force, therefore, has an axial component as well as a transverse component. The Coulombs friction force $F_t$ opposes the movement of the rod element 34 at the point of contact between the rod element 34 and the tubing 18. The weight W is shown as the gravitational force pulling downward on the rod element 34. A normal force N acts perpendicularly on the rod element 34 facing the center of curvature. Both the weight W and the normal force N have axial and transverse components as well.

Thus, the axial direction (i.e., the direction tangential to the rod) can be characterized with the following axial equation of motion:

$$\frac{\partial F}{\partial s} - A\gamma \frac{\partial^2 u}{\partial t^2} + \gamma g A \cos\theta - D\frac{\partial u}{\partial t} - F_t = 0, \quad (1)$$

Here, F is the axial force in the rod, u(t) is the axial displacement, A is the rod cross-sectional area, γ is the density, g is the acceleration of gravity, θ is the angle of inclination, D is the viscous damping coefficient, $F_t$ is the friction force from the tubing 18, s is the length measured along the curved rod, and t is time.

As noted above, the force $F_t$ is the Coulombs friction force, which is a nonlinear force that tends to oppose the motion of bodies within a mechanical system. Coulombs friction is representative of dry friction, which resists relative lateral motion of two solid surfaces in contact. The relative motion of the rod string 28, tubing 18, and couplings 18 as seen in FIG. 1 pressing against each other is a source of energy dissipation when the well is pumping.

In the transverse direction, the transverse equation of motion can be characterized as:

$$EI\frac{\partial^2}{\partial s^2}\left[\frac{\partial^2 v}{\partial s^2}+\frac{1}{R_\varphi}\right]+\gamma A\frac{\partial^2 v}{\partial t^2}+n_t+n_p+D_t\frac{\partial v}{\partial t}+\frac{F}{R}-\gamma gA\sin\theta=0, \quad (2)$$

$$EI\frac{\partial^4 v}{\partial s^4}+EI\frac{\partial^2}{\partial s^2}\frac{1}{R_\varphi}+\gamma A\frac{\partial^2 v}{\partial t^2}+n_t+n_p+D_t\frac{\partial v}{\partial t}+\frac{F}{R}-\gamma gA\sin\theta=0.$$

Here, EI is the bending stiffness, E is Young's modulus of elasticity, I is the bending moment, $D_t$ is the viscous damping factor in the transverse direction, $n_t$ is the transverse normal force from the tubing 18, an $n_p$ is the transverse normal force from the liquid under pressure p, and $$\frac{1}{R}$$

is an actual radius or curvature given by $$\frac{1}{R}=\frac{1}{R_\varphi}+\frac{\partial^2 v}{\partial s^2}.$$

As demonstrated by Lukasiewicz, the axial force can be introduced into the axial equation of motion (1) to give:

$$\frac{\partial^2 u}{\partial s^2}+\frac{\partial v}{\partial s}\cdot\frac{\partial^2 v}{\partial s^2}-\frac{1}{a^2}\frac{\partial^2 u}{\partial t^2}-\frac{D}{AE}\frac{\partial u}{\partial t}+\frac{\gamma g}{E}\cos\theta-\frac{F_t}{AE}=0, \quad (3)$$

Here, α is the acoustic velocity of the rod element 34. Furthermore, by assuming that the rod element 34 lies on the tubing 18 in between couplings 29, the axial equation of motion (1) can be written as:

$$\frac{\partial^2 u}{\partial s^2}-\frac{1}{a^2}\frac{\partial^2 u}{\partial t^2}-\frac{D}{AE}\frac{\partial u}{\partial t}+\frac{\mu}{R}\frac{\partial u}{\partial s}+\frac{\gamma g}{E}\cos\theta-\frac{\mu}{E}(\gamma g\sin\theta)=0, \quad (4)$$

Additional details on these equations and the axial force are disclosed in Lukasiewicz, S. A., "Dynamic Behavior of the Sucker Rod String in the Inclined Well," Production Operations Symposium, Apr. 7-9, 1991, which has been incorporated herein by reference.

As can be seen, axial equation of motion (3) uses the surface position of the rod string to calculate the downhole position at each finite difference node down the wellbore until the node right above the downhole pump. The axial and transverse equations of motion (3) and (2) are combined to form a system of two coupled non-linear differential equations of fourth order.

It is important to note that Coulombs friction (i.e., the mechanical friction that arises from the contact between the rods 28, tubing 18, and couplings 29) can be consequential in a deviated well and cannot be simulated using viscous damping. In particular, the Coulombs friction forces are not proportional to the velocity of the rod element as the viscous friction forces are. In some cases, the viscous damping factor can be increased to remove extra friction, but the downhole friction due to mechanical cannot be removed. If the viscous damping is pushed too far, the effects of the mechanical friction can look like they have been removed, but in reality the downhole data no longer represent what is happening at the downhole pump.

In equation (2), the second term is nonlinear and represents the effect of the vertical deflection on the axial displacement. It is noted that the equations given above are the same equations presented by Lukasiewicz, and that the model developed by Gibbs ignores the transverse movement of the rod string 28.

Being able to treat the mechanical friction when dealing with deviated wells has been a growing concern in the industry. Often, users try to remedy the downhole friction on a downhole card by modifying the viscous damping factor or by adding a drag force term (as done by Gibbs). Yet, this can essentially falsify the downhole results and can hide downhole conditions.

Although the prior art (and especially Lukasiewicz) has characterized the equations for motion of a rod string in a deviated well, practical techniques for performing the calculations are needed. This is especially true when the calculations are performed by a pump controller or other processing device, which may have limited processing capabilities.

DETAILED DESCRIPTION OF THE DISCLOSURE

According to the present disclosure, the modified Everitt-Jennings algorithm is used to compute downhole data from surface data by solving the one dimensional damped wave equation with finite differences. The one-dimensional damped wave equation, however, only takes into consideration friction of a viscous nature and ignores any type of mechanical friction. If the well is substantially vertical, mechanical friction is negligible, and the obtained downhole data may be accurate. However, in deviated or horizontal wells, mechanical friction between the rods, couplings, and tubing needs to be considered. According to this disclosure, the modified Everitt-Jennings method is adapted to utilize finite differences to incorporate mechanical friction factors in the calculation of downhole data in deviated or horizontal wells.

To do this, the teachings of the present disclosure use a finite difference approach to treat a system of two coupled non-linear differential equations, which encompass the forces acting on a rod element in a deviated well. The axial displacement and the transverse displacement of the rod element are considered, providing a complete model for analyzing the downhole conditions. As such, the teachings of the present disclosure utilize the equations as derived by Lukasiewicz, which has been described previously and incorporated herein by reference. The axial and transverse equations of motion for the rod element have been noted in the background section of the present disclosure.

Figure 1:
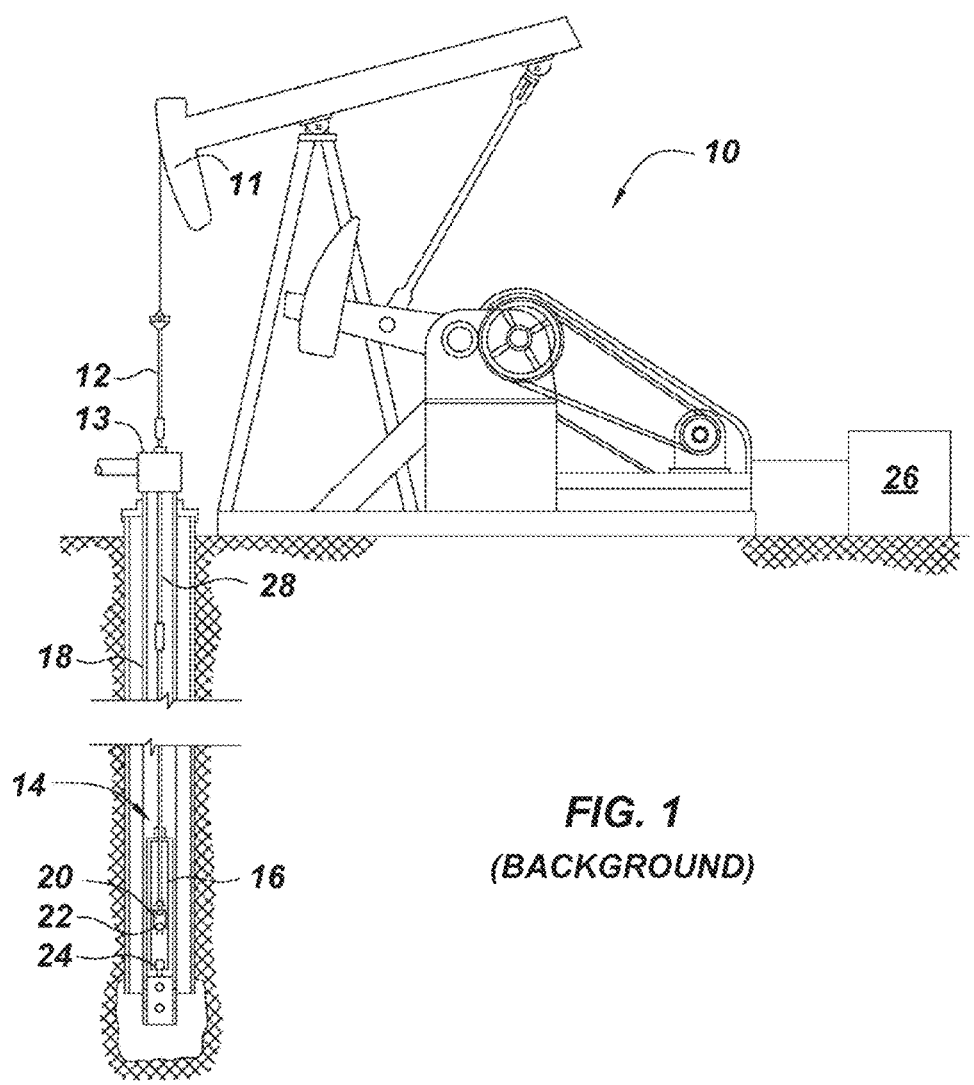
FIG. 1 illustrates a sucker rod pump system with a controller for controlling the system's pump.
Figure 2:
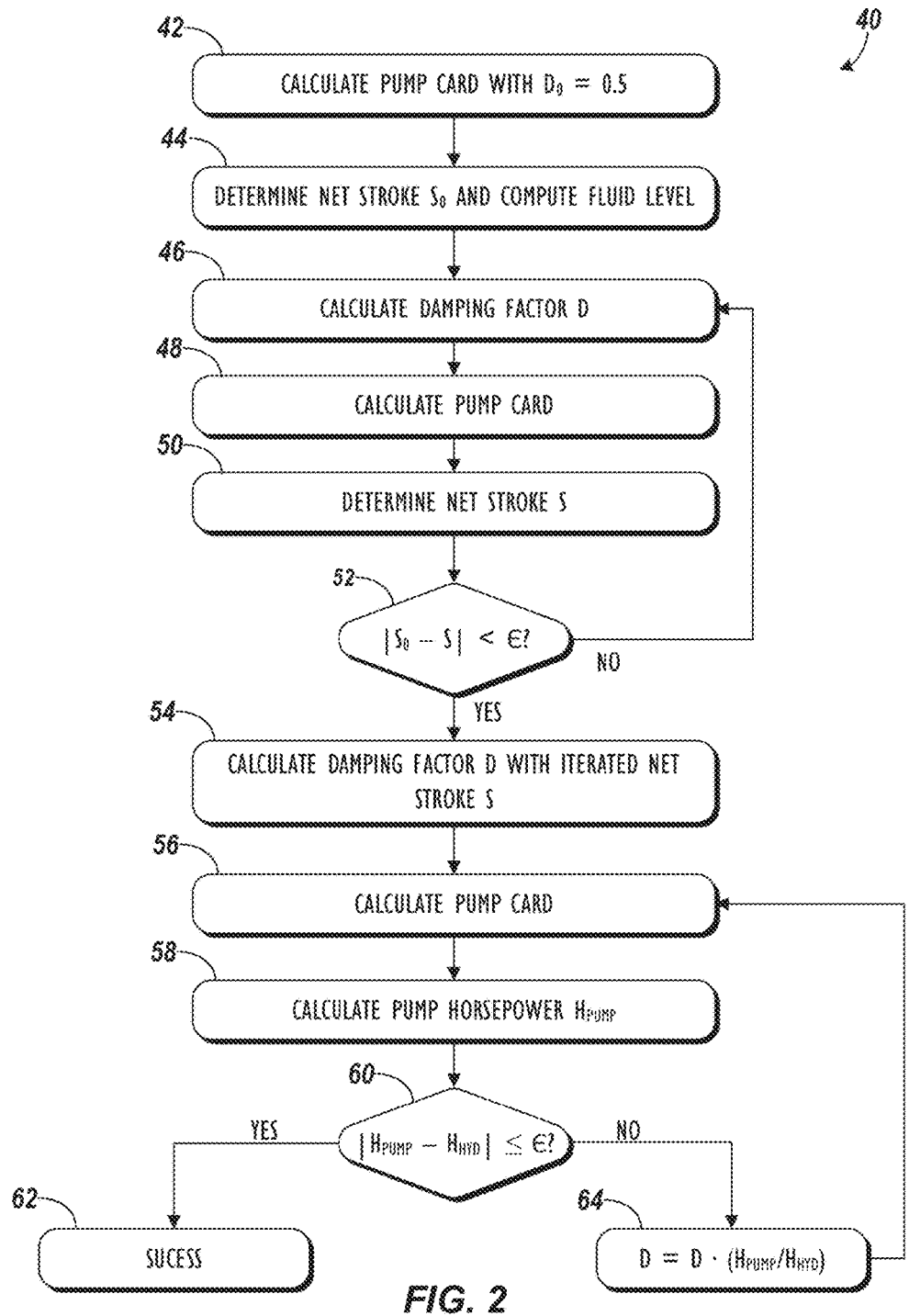
FIG. 2 illustrates iteration on netstroke and damping factor for the modified Everitt-Jennings algorithm to compute a pump card according to the prior art.
Figure 3A:
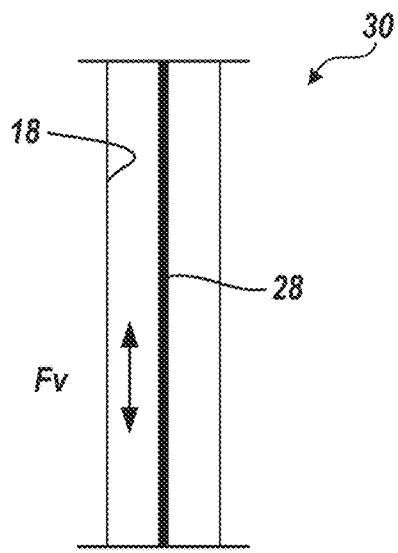
FIG. 3A diagrams a vertical well model.
Figure 3B:
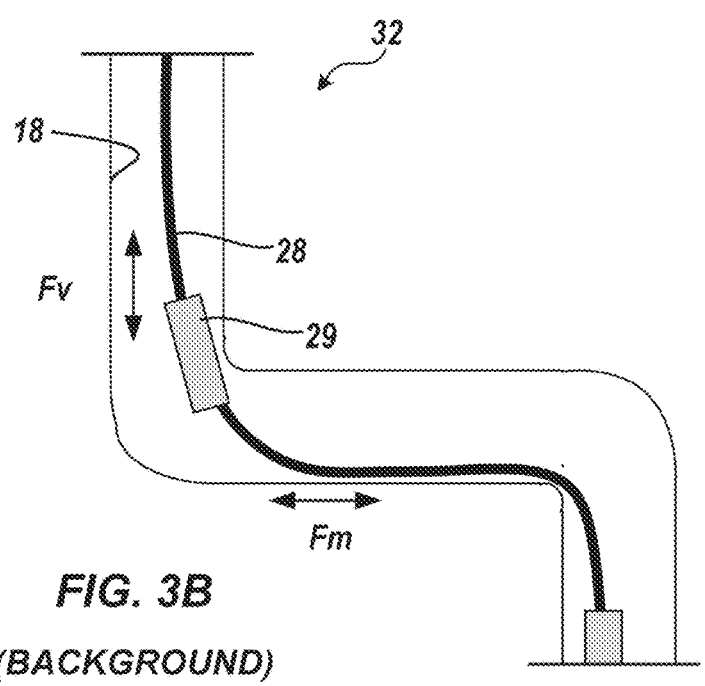
FIG. 3B diagrams a deviated well model.
Figure 4:
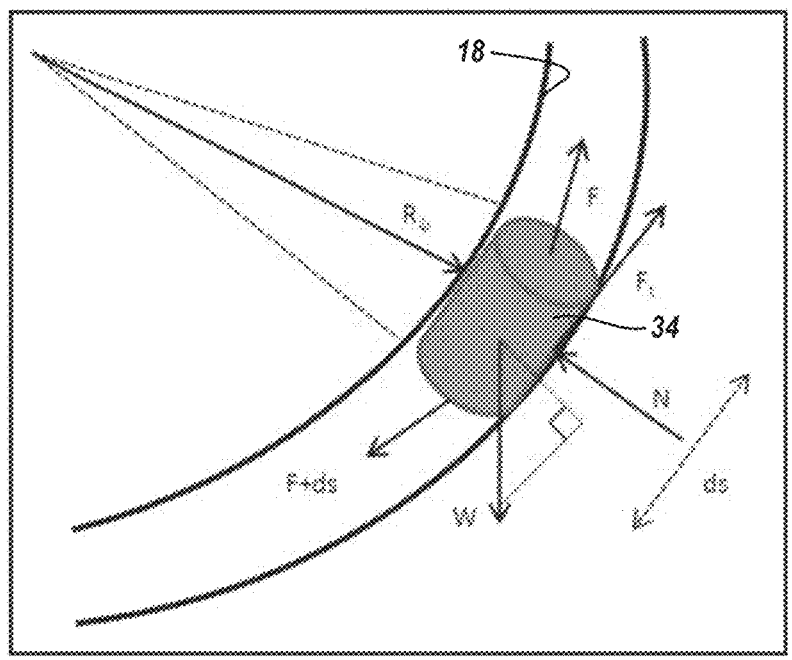
FIG. 4 diagrams dynamic behavior of a rod element of a sucker rod pump system for a deviated well.
Figure 5:
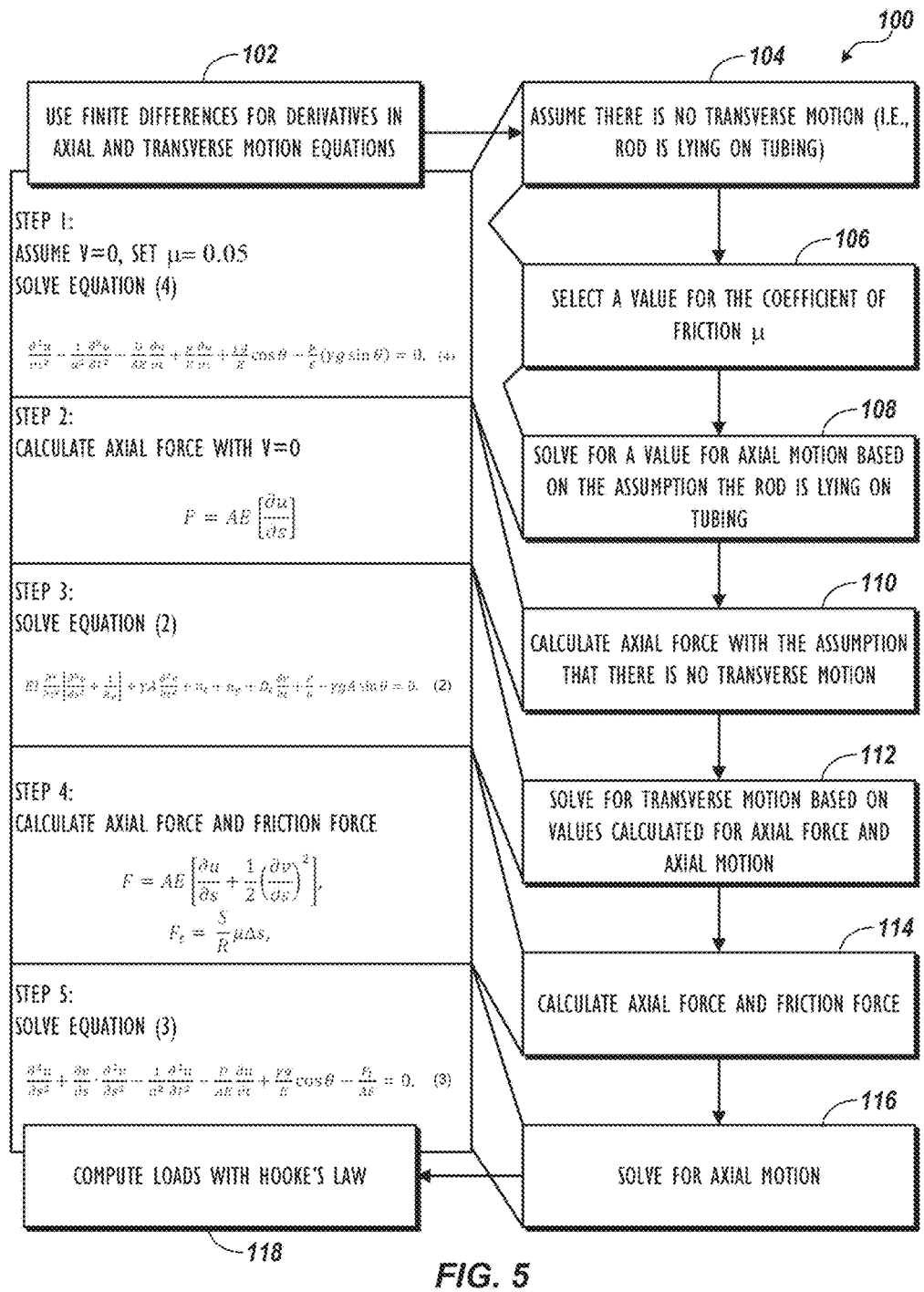
FIG. 5 illustrates a flowchart of a process for calculating downhole data for a sucker rod pump system in a deviated well.

Referring now to FIG. 5, a process 100 is illustrated in flowchart form for solving of the system of coupled differential equations for axial and transverse displacement of a rod element in a deviated well. For the derivatives that appear in the previous equations (2), (3), and (4), Taylor series approximations are used to generate finite difference analogs (Block 102). For the first and second derivatives, a first-order-correct central difference and a second-order-correct central difference are used, respectively. For more details on the derivation of the second derivative analog with respect to displacement. See Everitt, T. A. and Jennings, J. W.: "An Improved Finite-Difference Calculation of Downhole Dynamometer Cards for Sucker-Rod Pumps," SPE 18189, 1988, which is incorporated herein by reference.

In particular, the finite difference analogs are as follows (the subscript i represents the node at an axial distance of the rod string and the subscript j represents the timestep). For the space discretization, the finite difference analogs are:

$$\frac{\partial u}{\partial s_{i,j}} = \frac{(u_{i+1,j} - u_{i,j})}{\Delta s} - \frac{\Delta s}{2}\frac{\partial^2 u}{\partial s^2},$$

$$\frac{\partial v}{\partial s_{i,j}} = \frac{(v_{i+1,j} - v_{i,j})}{\Delta s} - \frac{\Delta s}{2}\frac{\partial^2 v}{\partial s^2},$$

$$\frac{\partial^2 u}{\partial s_{i,j}^2} = \frac{(u_{i+1,j} - 2u_{i,j} + u_{i-1,j})}{\Delta s^2} - \frac{\Delta s^2}{12}\frac{\partial^4 u}{\partial s^4},$$

$$\frac{\partial^2 v}{\partial s_{i,j}^2} = \frac{(v_{i+1,j} - 2v_{i,j} + u_{i-1,j})}{\Delta s^2} - \frac{\Delta s^2}{12}\frac{\partial^4 t}{\partial s^4}.$$

For the discretization in time, the finite difference analogs are:

$$\frac{\partial u}{\partial t_{i,j}} = \frac{(u_{i,j+1} - u_{i,j})}{\Delta t} - \frac{\Delta t}{2}\frac{\partial^2 u}{\partial t^2},$$

$$\frac{\partial v}{\partial t_{i,j}} = \frac{(v_{i,j+1} - v_{i,j})}{\Delta t} - \frac{\Delta t}{2}\frac{\partial^2 v}{\partial t^2},$$

$$\frac{\partial^2 u}{\partial t_{i,j}^2} = \frac{(u_{i,j+1} - 2u_{i,j} + u_{i,j-1})}{\Delta t^2} - \frac{\Delta t^2}{12}\frac{\partial^4 u}{\partial t^4},$$

$$\frac{\partial^2 v}{\partial t_{i,j}^2} = \frac{(v_{i,j+1} - 2v_{i,j} + v_{i,j-1})}{\Delta t^2} - \frac{\Delta t^2}{12}\frac{\partial^4 v}{\partial t^4}.$$

The analogs for the derivatives with respect to time are straight forward. However, the derivatives with respect to space of a degree greater than one preferably have the finite difference analogs split into several equations to accommodate different taper properties of the rod string 28. Splitting the finite difference analogs into several equations primarily allows one to pick a change in length Δs of the curved rod so that values for the position, load, and stress can be calculated at chosen steps down the wellbore as opposed to having to interpolate between fixed points. This option allows a user more freedom to refine the discretization to optimize stress analysis.

To handle the fourth order derivative with respect to displacement, a central finite difference scheme of second order is used:

$$\frac{\partial^4 v}{\partial s_{i,j}^4} = \frac{v_{i+2,j} - 4v_{i+1,j} + 6v_{i,j} - 4v_{i-1,j} + v_{i-2,j}}{\Delta s^4} - \frac{\Delta s^2}{6}\frac{\partial^6 v}{\partial s^6}.$$

To run a diagnostic model of a deviated well based on surface measurements and calculate a downhole pump card, the transverse and axial equations of motion (2) and (3) must be solved simultaneously. The teachings of the present disclosure provide a solution to the model for a deviated well, as discussed in detail below.

Without loss of generality, as an initialization step (Block 104), the rod string 28 can be assumed to lie on the tubing 18 to solve for an initial value for the axial displacement u. In other words, it is assumed that there is not transverse displacement, i.e., v=0. In this case, a value of the coefficient of friction (μ) (for the friction force acting on the rod string 28 from the tubing 18) is selected as 0.05, which can be based on empirical evidence or other information (Block 106), and the simplified version of the axial equation of motion (4) assuming no transverse motion is solved first (Block 108).

In particular, introducing the finite difference analogs into the simplified version of the axial equation of motion (4) yields:

$$u_{i+1,j} = u_{i,j}\left(\frac{\frac{\mu\Delta t^2 \Delta s}{R} + 2\Delta t^2 + 2\frac{\Delta s^2}{a^2} - \frac{D\Delta s^2 \Delta t}{AE}}{\Delta t^2 + \frac{\mu\Delta t^2 \Delta s^2}{R}}\right) + u_{i,j+1}\left(\frac{\frac{\Delta s^2}{a^2} - \frac{D\Delta s^2 \Delta t}{AE}}{\Delta t^2 + \frac{\mu\Delta t^2 \Delta s^2}{R}}\right) +$$

$$u_{i-1,j}\left(\frac{-\Delta t^2}{\Delta t^2 + \frac{\mu\Delta t^2 \Delta s^2}{R}}\right) + u_{i,j-1}\left(\frac{\frac{\Delta s^2}{a^2}}{\Delta t^2 + \frac{\mu\Delta t^2 \Delta s^2}{R}}\right) -$$

$$\cos\theta\left(\frac{-\frac{\mu g \Delta s^2 \Delta t^2}{E}}{\Delta t^2 + \frac{\mu\Delta t^2 \Delta s^2}{R}}\right) + \gamma g \sin\theta\left(\frac{\frac{\mu \Delta s^2 \Delta t^2}{E}}{\Delta t^2 + \frac{\mu\Delta t^2 \Delta s^2}{R}}\right).$$

Next, still assuming that there is not transverse displacement, the axial force F is calculated (Block 110), and the transverse equation of motion (2) is solved accordingly (Block 112). In particular, introducing the finite difference analogs into the axial force and the transverse equation of motion (2) yields:

$$F = AE\left[\frac{\partial u}{\partial s}\right] = AE\left(\frac{(u_{i+1,j} - u_{i,j})}{\Delta s}\right),$$

$$v_{i+2,j} = 4v_{i+1,j} - 4v_{i-1,j} - v_{i-2,j} - v_{i,j}\left(6 - \frac{\frac{2\gamma A}{\Delta t^2} - \frac{D_t}{\Delta t}}{\frac{EI}{\Delta s^4}}\right) -$$

-continued $$v_{i,j+1}\left(\frac{\frac{\gamma A}{\Delta t^2} - \frac{D_t}{\Delta t}}{\frac{EI}{\Delta s^4}}\right) - v_{i,j-1}\left(\frac{\gamma A \Delta s^4}{\Delta t^2 EI}\right) - u_{i+1,j}\left(\frac{A\Delta s^3}{RI}\right) -$$

$$u_{i,j}\left(-\frac{A\Delta s^3}{RI}\right) - \left(\frac{\Delta s^4}{EI}\right)\left(NT + \frac{\pi p r^2}{R_\varphi} - \gamma g A \sin\theta\right).$$

At this point, initial values for the transverse displacement v and the axial displacement u are available. The axial force F and the friction force $F_t$ are solved (Block 114), and the axial equation of motion (3) is solved (Block 116). In particular, introducing the finite difference analogs into the axial force F, the friction force $F_t$, and the axial equation of motion (3) yields:

$$F = AE\left[\frac{\partial u}{\partial s} + \frac{1}{2}\left(\frac{\partial v}{\partial s}\right)^2\right],$$

$$F = AE\left[\frac{(u_{i+1,j} - u_{i,j})}{\Delta s} + \frac{v_{i+1,j}^2 - 2v_{i+1,j}v_{i,j} + v_{i,j}^2}{2\Delta s^2}\right].$$

$$F_t = \frac{S}{R}\mu\Delta s,$$

$$F_t = \frac{AE\mu}{2R\Delta s}[2\Delta s(u_{i+1,j} - u_{i,j}) + v_{i+1,j}^2 - 2v_{i+1,j}v_{i,j} + v_{i,j}^2].$$

$$u_{i+1,j} = \frac{1}{\Delta s^2 - \frac{\mu}{R}}\begin{bmatrix} u_{i,j}\left(\frac{2}{\Delta s^2} + \frac{2}{\Delta t^2 \alpha^2} - \frac{D}{AE\Delta t^2} - \frac{\mu}{R}\right) + \\ u_{i-1,j}\left(-\frac{1}{\Delta s^2}\right) + u_{i,j+1}\left(\frac{1}{\Delta t^2 \alpha^2} + \frac{D}{AE\Delta t^2}\right) + \\ u_{i,j-1}\left(\frac{1}{\Delta t^2 \alpha^2}\right) + v_{i+1,j}^2\left(\frac{\mu}{2R\Delta s} - \frac{1}{\Delta s^3}\right) + \\ v_{i,j}^2\left(\frac{\mu}{2R\Delta s} - \frac{2}{\Delta s^3}\right) + v_{i+1,j} \cdot v_{i,j}\left(\frac{3}{\Delta s^3} - \frac{1}{\mu R\Delta s}\right) + \\ v_{i-1,j} \cdot v_{i+1,j}\left(-\frac{1}{\Delta s^3}\right) + v_{i-1,j} \cdot v_{i,j}\left(\frac{1}{\Delta s^3}\right) - \frac{\gamma g}{E}\cos\theta \end{bmatrix}.$$

Finally, solving for the displacement $u_{i+1,j}$ in the above system yields the downhole position at the downhole pump used to calculate the downhole pump card (Block 116). Load at the downhole pump is then computed using Hooke's law (i.e., $$\text{Load} = EA\left(\frac{\partial u}{\partial s}\right)$$

(Block 118). Thus, at this point, the solution can follow the form used in the Everitt-Jennings method.

In particular, solving for the displacement $u_{i+1,j}$ in the above system requires knowing displacement two nodes behind in space, $u_{i,j}$ and $u_{i-1,j}$ relative to the node being calculated $u_{i+1,j}$. To start the solution, the displacements $u_{0,j}$ and $u_{1,j}$ need to be known for all of the timesteps j. The initial displacement $u_{0,j}$ is know from the surface measurements of the sucker rod pump system, but the next node's displacement $u_{1,j}$ is calculated with Hooke's law when the polished rod load, $\text{Load}_{PR}$ (the surface load minus the buoyed weight of the rods), is substituted for the Load and a first-order-correct forward-difference analog is substituted for $$\frac{\partial u}{\partial s},$$

which yields:

$$u_{i,j} = \left(\text{Load}_{PR,j} \times \frac{\Delta s}{EA}\right) + u_{0,j}$$

Since the numerical methodology for solving the system of coupled nonlinear differential equations is similar to the numerical implementation of the modified Everitt-Jennings method, a similar iterative method can be used to calculate the net stroke and damping factor for the deviated well model disclosed herein. See, e.g., Pons-Ehimeakhe, V., "Modified Everitt-Jennings Algorithm With Dual Iteration on the Damping Factors," 2012 South Western Petroleum Short Course, Lubbock, Tex., April 18-19. Moreover, to optimize the resolution of the viscous damping in the deviated model disclosed herein, the current algorithm can further include an iteration on single or dual damping factors as disclosed in co-pending application Ser. No. 13/633,167 entitled "Calculating Downhole Pump Card With Iterations on Single Damping Factor" and Ser. No. 13/633,174 entitled "Calculating Downhole Pump Card With Iterations on Dual Damping Factors", which are incorporated herein by reference. Thus, a single damping factor D that covers viscous damping or dual damping factors $D_{up}$ and $D_{down}$ in the above equations for the upstroke and downstroke can be iterated on in conjunction with fluid load line calculations and concavity testing to better converge on the appropriate damping for the downhole pump card generated.

Using finite differences to solve the system of coupled differential equations is a useful method for analyzing stress in the sucker rod pump system. Splitting the finite difference analogs for the space discretization allows the model to be valid for a tapered rod string, including steel rods and fiberglass rods with sinker bars. Finally, including Coulombs friction in the analysis of the deviated well model gives a better approximation of the downhole conditions than using a vertical-hole model.

The process 100 disclosed herein, when applied as a diagnostic tool, generates a downhole card without the excess downhole friction caused by deviation and with optimal viscous damping. This process 100 is particularly useful for controlling wells based on the downhole data. As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure.

Figure 6A:
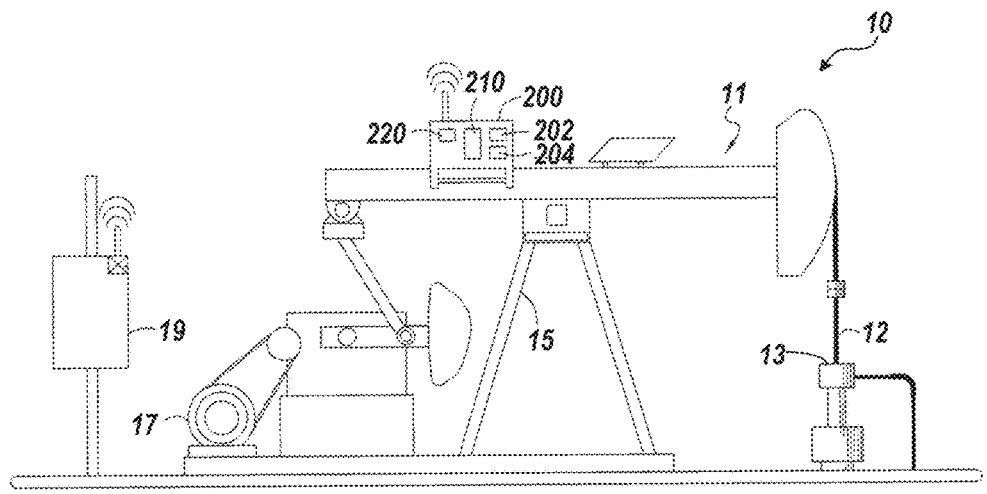
FIG. 6A illustrates a pump controller according the present disclosure for a sucker-rod pump system.

To that end, the teachings of the present disclosure can be implemented in a remote processing device or a pump controller. For example, FIG. 6A shows an embodiment of a pump controller 200 installed on a sucker-rod pump system 10, such as a pump jack commonly used to produce fluid from a well. The pump system 10 includes a walking beam 11 connected to a frame 15. The walking beam 11 operatively connects to a polished rod 12 connected via a rod string (not shown) to a downhole pump (not shown), which can be any downhole reciprocating pump as discussed herein. A motor control panel 19 controls a motor 17 to move the walking beam 11 and reciprocate the polished rod 12, which in turn operates the downhole pump. Although a pump jack is shown, other sucker-rod pump systems can be used, such as a strap jack, or any other system that reciprocates a rod string using cables, belts, chains, and hydraulic and pneumatic power systems.

In general, sensors 202 and 204 measure load and position data of the pump system 10 at the surface, and the measured data from the sensors 202 and 204 is relayed to the controller 200. After processing the information, the controller 200 sends signals to the motor control panel 19 to operate the pump system 10. A particular arrangement of controller 200 and sensors 202 and 204 is disclosed in U.S. Pat. No. 7,032,659, which is incorporated herein by reference.

As shown, the controller 200 uses a load sensor 202 to detect the weight of the fluid in the production tubing during operation of the pump system 10 and uses a position sensor 204 to measure the position of the pump system 10 over each cycle of stroke. The position sensor 204 can be any position measurement device used for measuring position relative to the top or bottom of the stroke. For example, the position sensor 204 can be a dual position sensor that produces a continuous position measurement and a discrete switch output that closes and opens at preset positions of the polished rod 12.

Alternatively, the degree of rotation of the pump system's crank arm can provide displacement data. For example, a sensor can determine when the system's crank arm passes a specific location, and a pattern of simulated polished rod displacement versus time can be adjusted to provide an estimate of polished rod positions at times between these crank arm indications. In another alternative, a degree of inclination of the walking beam 11 can provide displacement data. For example, a device can be attached to the walking beam 11 to measure the degree of inclination of the pumping unit.

Load data of the system 10 can be directly measured using a load cell inserted between a polished rod clamp and carrier bar. Alternatively, the strain on the walking beam 11 can provide the load data. Using a load sensor 202, for example, the controller 200 can measure the strain on the polished rod 12 and can then control the pump system 10 based on the strain measured. The load sensor 202 may use any of a variety of strain-measuring devices known to a person of ordinary skill in the art. For example, the load sensor 202 can be a load measurement device used on the pump system 10 that includes a load cell installed on the pumping rod 12 or mounted on the walking beam 11. The load sensor 202 can measure strain in the polished rod 12 and can use a strain-gage transducer welded to the top flange of the walking beam 11.

Alternatively, the load sensor 202 can be a strain measuring device that clamps on to a load-bearing surface of the walking beam 11 or any convenient location as disclosed in U.S. Pat. No. 5,423,224. In another example, the load sensor 202 can use an assembly similar to what is disclosed in U.S. Pat. No. 7,032,659, which is incorporated herein by reference in its entirety.

Finally, the amplitude and frequency of the electrical power signal applied to the motor 17 can be used to determine motor rotation (i.e. displacement data) and motor torque (i.e. load data). In this way, the motor speed and the displacement of the polished rod can provide a series of motor speed and displacement data pairs at a plurality of displacements along the polished rod. That displacement data which represents a complete stroke of the pump system 10 can then be converted to load on the rod string and displacement of the rod string at a plurality of displacements along the polished rod, as described in U.S. Pat. No. 4,490,094.

Figure 6B:
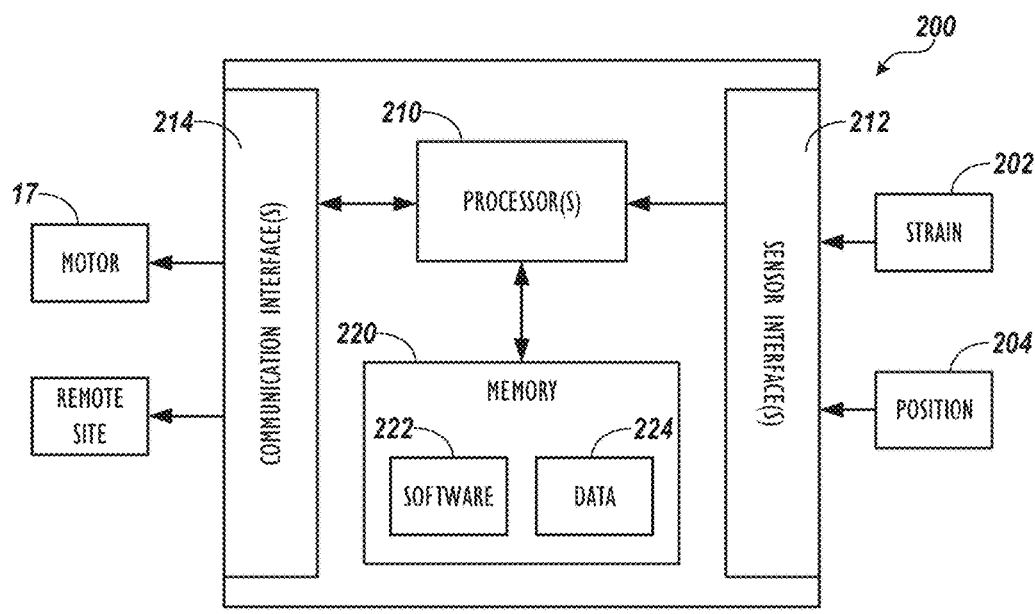
FIG. 6B illustrates a schematic of the pump controller for controlling/diagnosing the sucker-rod pump system according to the present disclosure.

Details of the pump controller 200 are schematically shown in FIG. 6B. In general, the controller 200 includes one or more sensor interfaces 212 receiving measurements from the load and position sensors 202 and 204. Additional inputs of the controller 200 can connect to other devices, such as an infrared water-cut meter, an acoustic sounding device (ASD) provide real-time data which can be logged for pressure buildup analysis and real-time calibration for fluid-level control. The controller 200 also include a power system (not shown), as conventionally provided.

The controller 200 can have software 222 and data 224 stored in memory 220. The memory 220 can be a battery-backed volatile memory or a non-volatile memory, such as a one-time programmable memory or a flash memory. Further, the memory 220 may be any combination of suitable external and internal memories.

The software 222 can include motor control software and pump diagnostic software, and the data 224 stored can be the measurements logged from the various load and position sensors 202 and 204 and calculation results. The data 224 in the memory 220 stores characteristics of the well, including the depth, azimuth, and inclination of points along the well, which can be derived from drilling and survey data. Because the rod string may be tapered as is sometimes the case, the data 224 in the memory 220 can also store characteristics of the sucker rods taper, such as depth, diameter, weight, and length of various sections of the rod.

A processing unit 210 having one or more processors then processes the measurements by storing the measurement as data 224 in the memory 220 and by running the software 222 to make various calculations as detailed herein. For example, the processing unit 210 obtains outputs from the surface sensors, such as the load and position measurements from then sensors 202 and 204. In turn, the processing unit 210 correlates the output from the load sensor 202 to the position of the polished rod 12 and determines the load experienced by the polished rod 12 during the stroke cycles. Using the software 212, the processing unit 210 then calculates the downhole card indicative of the load and position of the downhole pump.

To control the pump system 10, the pump controller 200 preferably uses an unabbreviated Everitt-Jennings algorithm with finite differences to solve the wave equation. The controller 200 calculates pump fillage and optimizes production on each stroke. This information is used to minimize fluid pounding by stopping or slowing down the pump system 10 at the assigned pump fillage setting. The pump controller 200 can also analyze the downhole pump card and determine potential problems associated with the pump and its operation. This is so because the shape, pattern, and other features associated with the downhole pump card represents various conditions of the pump and its operation.

After processing the measurements, the controller 200 sends signals to the motor control panel 19 to operate the pump system 10. For example, one or more communication interfaces 214 communicate with the motor control panel 19 to control operation of the pump system 10, such as shutting off the motor 17 to prevent pump-off, etc. The communication interfaces 214 can be capable of suitable forms of communications, and they may also communicate data and calculation results to a remote site using any appropriate communication method.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of diagnosing a pump apparatus having a downhole pump disposed in a deviated wellbore, having a controller of limited processing capability, and having a motor at a surface of the deviated wellbore, the downhole pump reciprocated in the deviated wellbore by a rod string operatively moved by the motor, the method comprising:

obtaining surface measurements indicative of surface load and surface position of the rod string at the surface;

characterizing axial and transverse displacement of the rod string with two coupled non-linear differential equations of fourth order including an axial equation of motion and a transverse equation of motion by replacing derivatives of the two coupled non-linear differential equations with finite difference analogs;

solving the finite difference analogs of the two coupled non-linear differential equations by performing calculating steps with the controller of limited processing capability comprising:

initially calculating initial axial displacement of the rod string by assuming there is no transverse displacement and by solving the axial equation of motion;

initially calculating initial axial force using the initial axial displacement and assuming there is no transverse displacement;

first calculating initial transverse displacement of the rod string by using the initial axial force as initially calculated and using the initial axial displacement as initially calculated;

second calculating axial force and friction force by using the initial axial displacement as initially calculated and using the initial transverse displacement as first calculated; and obtaining an axial displacement determination at the downhole pump by third solving the axial equation of motion using the axial force and the friction force as second calculated;

calculating with the controller of limited processing capability load at the downhole pump;

generating with the controller of limited processing capability a downhole card representative of the load relative to the axial displacement determination of the downhole pump obtained by the calculating steps; and modifying at least one parameter of the pump apparatus based on the generated downhole card by changing operation of the motor.

2. The method of claim 1, wherein obtaining the surface measurements comprises measuring the surface load and the surface position of the rod string at the surface.

3. The method of claim 1, wherein obtaining the surface measurements comprises obtaining the surface measurement from a memory storing the surface measurement.

4. The method of claim 1, wherein the transverse equation of motion is defined by:

$$EI\frac{\partial^2}{\partial s^2}\left[\frac{\partial^2 v}{\partial s^2} + \frac{1}{R_\varphi}\right] + \gamma A \frac{\partial^2 v}{\partial t^2} + n_t + n_p + D_t \frac{\partial v}{\partial t} + \frac{F}{R} - \gamma gA\sin\theta = 0,$$

wherein EI is a bending stiffness of a rod element, E is Young's modulus of elasticity, I is a bending moment, $R_\varphi$ is a radius of curvature of tubing in the deviated wellbore, $\gamma$ is a density of the rod element, A is a cross-sectional area of the rod element, $n_t$ is a transverse normal force from tubing in the deviated wellbore, an $n_p$ is a transverse normal force from liquid under pressure p, $D_t$ is a viscous damping factor in a transverse direction, F is an axial force on the rod element, $$\frac{1}{R}$$

is an actual radius of curvature given by $$\frac{1}{R} = \frac{1}{R_\varphi} + \frac{\partial^2 v}{\partial s^2},$$

g is acceleration due to gravity, $\theta$ is an angle of inclination, and t is time.

5. The method of claim 1, wherein the axial equation of motion is defined by:

$$\frac{\partial^2 u}{\partial s^2} + \frac{\partial v}{\partial s} \cdot \frac{\partial^2 v}{\partial s^2} - \frac{1}{a^2}\frac{\partial^2 u}{\partial t^2} - \frac{D}{AE}\frac{\partial u}{\partial t} + \frac{\gamma g}{E}\cos\theta - \frac{F_t}{AE} = 0,$$

wherein u(t) is axial displacement of a rod element, a is acoustic velocity of the rod element, A is a cross sectional area of the rod element, E is Young's modulus of elasticity of the rod element, $\gamma$ is a density of the rod element, g is acceleration due to gravity, $\theta$ is an angle of inclination, D is a viscous damping coefficient, $F_t$ is a friction force from tubing, s is a length measured along the rod element, and t is time.

6. The method of claim 1, wherein modifying the at least one parameter of the pump apparatus based on the generated downhole card comprises stopping the motor or adjusting a speed of the motor.

7. A non-transitory program storage device having program instructions stored thereon for causing a programmable control device to perform a method of diagnosing a pump apparatus having a downhole pump disposed in a deviated wellbore, having a controller of limited processing capability, and having a motor at a surface of the deviated wellbore, the downhole pump reciprocated in the deviated wellbore by a rod string operatively moved by the motor, the method comprising:

obtaining surface measurements indicative of surface load and surface position of the rod string at the surface;

characterizing axial and transverse displacement of the rod string with two coupled non-linear differential equations of fourth order including an axial equation of motion and a transverse equation of motion by replacing derivatives of the two coupled non-linear differential equations with finite difference analogs;

solving the finite difference analogs of the two coupled non-linear differential equations by performing calculating steps with the controller of limited processing capability comprising:

initially calculating initial axial displacement of the rod string by assuming there is no transverse displacement and by solving the axial equation of motion;

initially calculating initial axial force using the initial axial displacement and assuming there is no transverse displacement;

first calculating initial transverse displacement of the rod string by using the initial axial force as initially calculated and using the initial axial displacement as initially calculated;

second calculating axial force and friction force by using the initial axial displacement as initially calculated and using the initial transverse displacement as first calculated; and obtaining an axial displacement determination at the downhole pump by third solving the axial equation of motion using the axial force and the friction force as second calculated;

calculating with the controller of limited processing capability load at the downhole pump;

generating with the controller of limited processing capability a downhole card representative of the load relative to the axial displacement determination of the downhole pump obtained by the calculating steps; and modifying at least one parameter of the pump apparatus based on the generated downhole card by changing operation of the motor.

8. The program storage device of claim 7, wherein obtaining the surface measurements comprises measuring the surface load and the surface position of the rod string at the surface.

9. The program storage device of claim 7, wherein obtaining the surface measurements comprises obtaining the surface measurement from a memory storing the surface measurement.

10. The program storage device of claim 7, wherein the transverse equation of motion is defined by:

$$EI\frac{\partial^2}{\partial s^2}\left[\frac{\partial^2 v}{\partial s^2} + \frac{1}{R_\varphi}\right] + \gamma A\frac{\partial^2 v}{\partial t^2} + n_t + n_p + D_t\frac{\partial v}{\partial t} + \frac{F}{R} - \gamma gA\sin\theta = 0,$$

wherein EI is a bending stiffness of a rod element, E is Young's modulus of elasticity, I is a bending moment, $R_\varphi$ is a radius of curvature of tubing in the deviated wellbore, $\gamma$ is a density of the rod element, A is a cross-sectional area of the rod element, $n_t$ is a transverse normal force from tubing in the deviated wellbore, an $n_p$ is a transverse normal force from liquid under pressure p, $D_t$ is a viscous damping factor in a transverse direction, F is an axial force on the rod element, $$\frac{1}{R}$$

is an actual radius of curvature given by $$\frac{1}{R} = \frac{1}{R_\varphi} + \frac{\partial^2 v}{\partial s^2},$$

g is acceleration due to gravity, $\theta$ is an angle of inclination, and t is time.

11. The program storage device of claim 7, wherein the axial equation of motion is defined by:

$$\frac{\partial^2 u}{\partial s^2} + \frac{\partial v}{\partial s} \cdot \frac{\partial^2 v}{\partial s^2} - \frac{1}{a^2}\frac{\partial^2 u}{\partial t^2} - \frac{D}{AE}\frac{\partial u}{\partial t} + \frac{\gamma g}{E}\cos\theta - \frac{F_t}{AE} = 0,$$

wherein u(t) is axial displacement of a rod element, a is acoustic velocity of the rod element, A is a cross sectional area of the rod element, E is Young's modulus of elasticity of the rod element, $\gamma$ is a density of the rod element, g is acceleration due to gravity, $\theta$ is an angle of inclination, D is a viscous damping coefficient, $F_t$ is a friction force from tubing, s is a length measured along the rod element, and t is time.

12. The program storage device of claim 7, wherein modifying the at least one parameter of the pump apparatus based on the generated downhole card comprises stopping the motor or adjusting a speed of the motor.

13. A controller for a pump apparatus having a surface motor and having a downhole pump, the downhole pump disposed in a deviated wellbore and reciprocated by a rod string disposed in the deviated wellbore, the controller comprising:

one or more interfaces obtaining surface measurements indicative of surface load and surface position of the rod string at the surface;

memory in communication with the one or more interfaces and storing first characteristics of the deviated wellbore and second characteristics of the rod string, the memory storing a model characterizing axial and transverse displacement of the rod string with two coupled non-linear differential equations of fourth order including an axial equation of motion and a transverse equation of motion having derivatives replaced with finite difference analogs; and a processing unit in communication with the one or more interfaces and the memory, the processing unit having limited processing capability and configured to:

solve the finite difference analogs of the two coupled non-linear differential equations by performing calculating steps comprising:

initially calculate initial axial displacement of the rod string by assuming there is no transverse displacement and by solving the axial equation of motion, initially calculate initial axial force using the initial axial displacement and assuming there is no transverse displacement, first calculate initial transverse displacement of the rod string by using the initial axial force as initially calculated and using the initial axial displacement as initially calculated, second calculate axial force and friction force using the initial axial displacement as initially calculated and using the initial transverse displacement as initially calculated, and solve the axial equation of motion using the axial force and the friction force as second calculated to obtain an axial displacement determination at the downhole pump, calculate load at the downhole pump,
generate a downhole card representative of the load relative to the axial displacement determination of the downhole pump obtained by the calculating steps, and
change operation of the motor to modify at least one parameter of the pump apparatus based on the generated downhole card.

14. The controller of claim 13, wherein the transverse equation of motion is defined by:

$$EI\frac{\partial^2}{\partial s^2}\left[\frac{\partial^2 v}{\partial s^2} + \frac{1}{R_\varphi}\right] + \gamma A\frac{\partial^2 v}{\partial t^2} + n_t + n_p + D_t\frac{\partial v}{\partial t} + \frac{F}{R} - \gamma gA\sin\theta = 0,$$

wherein EI is a bending stiffness of a rod element, E is Young's modulus of elasticity, I is a bending moment, $R_\varphi$ is a radius of curvature of tubing in the deviated wellbore, $\gamma$ is a density of the rod element, A is a cross-sectional area of the rod element, $n_t$ is a transverse normal force from tubing in the deviated wellbore, an $n_p$ is a transverse normal force from liquid under pressure p, $D_t$ is a viscous damping factor in a transverse direction, F is an axial force on the rod element, $$\frac{1}{R}$$

is an actual radius or curvature given by $$\frac{1}{R} = \frac{1}{R_\varphi} + \frac{\partial^2 v}{\partial s^2},$$

g is acceleration due to gravity, $\theta$ is an angle of inclination, and t is time.

15. The controller of claim 13, wherein the axial equation of motion is defined by:

$$\frac{\partial^2 u}{\partial s^2} + \frac{\partial v}{\partial s} \cdot \frac{\partial^2 v}{\partial s^2} - \frac{1}{a^2}\frac{\partial^2 u}{\partial t^2} - \frac{D}{AE}\frac{\partial u}{\partial t} + \frac{\gamma g}{E}\cos\theta - \frac{F_t}{AE} = 0,$$

wherein u(t) is axial displacement of a rod element, a is acoustic velocity of the rod element, A is a cross sectional area of the rod element, E is Young's modulus of elasticity of the rod element, $\gamma$ is a density of the rod element, g is acceleration due to gravity, $\theta$ is an angle of inclination, D is a viscous damping coefficient, $F_t$ is a friction force from tubing, s is a length measured along the rod element, and t is time.

16. The controller of claim 13, wherein to change operation of the motor to modify the at least one parameter of the pump apparatus based on the generated downhole card, the processing unit is configured to stop the motor or adjust a speed of the motor.

* * * * *